United States Patent [19]

Markvik

[11] 4,264,481
[45] Apr. 28, 1981

[54] PROCESS OF RECLAIMING RUBBER

[75] Inventor: Nils E. Markvik, Trelleborg, Sweden

[73] Assignee: Trelleborg AB, Trelleborg, Sweden

[21] Appl. No.: 54,496

[22] Filed: Jul. 3, 1979

[30] Foreign Application Priority Data

Jun. 25, 1979 [SE] Sweden .............................. 7905528
Jul. 3, 1979 [SE] Sweden .............................. 7807479

[51] Int. Cl.$^3$ ............................................. B29H 19/00
[52] U.S. Cl. ................................... 260/2.3; 260/710; 260/720
[58] Field of Search ........................ 260/710, 720, 2.3

[56] References Cited

U.S. PATENT DOCUMENTS

| | | | |
|---|---|---|---|
| 2,088,920 | 8/1937 | Pickett | 18/52 |
| 2,783,213 | 2/1957 | le Beau | 260/2.3 |
| 2,800,462 | 7/1957 | Sverdrup | 260/710 |
| 2,804,651 | 9/1957 | Peterson | 260/710 |
| 2,871,205 | 1/1959 | Mankowich et al. | 260/710 |
| 2,939,850 | 6/1960 | Clayton | 260/2.3 |
| 3,272,761 | 9/1966 | Glenn et al. | 260/710 |
| 3,896,059 | 7/1975 | Wakefield et al. | 260/2.3 |
| 4,125,578 | 11/1978 | Sear | 260/2.3 |
| 4,146,508 | 3/1979 | Maxwell | 260/2.3 |

FOREIGN PATENT DOCUMENTS

965177 7/1964 United Kingdom.

OTHER PUBLICATIONS

Yamashita et al., *International Polymer Science & Technology*, Vol. 3, No. 8, 1976, pp. T75-T81.
Yoshioka et al., *Chem. Abs.* 84, 45783h, 1976.

*Primary Examiner*—Maurice J. Welsh
*Attorney, Agent, or Firm*—Beveridge, DeGrandi, Kline & Lunsford

[57] ABSTRACT

Chemical direct reclaiming of rubber by mixing pulverulent scrap rubber having a particle size of at most 1 mm with a reducing agent, an oxidizable iron metal chloride and at least one plasticizer. The mixture is agitated for a short time, in the solid phase in air at a temperature of not more than 100° C., in a powder mixer for direct degradation of double bonds in the rubber. The reducing agent is from 0.2 to 1 weight % of phenyl hydrazine or diphenyl guanidine. The iron metal chloride is admixed in an amount of from 0.1 to 0.4 weight %. The plasticizer shall comprise at least one member from the group tall oil pitch and dipentene, and this plasticizer may be used in mixture with some other plasticizer. The amount of dipentene is at most 5 weight % and is from 0.5 to 5 weight % if the dipentene is used as the only plasticizer or is used in mixture with another plasticizer. The amount of tall oil pitch is at most 17.5 weight % and is from 7 to 17.5 weight % if the tall oil pitch is used as the only plasticizer or is used in mixture with a plasticizer other than dipentene. If tall oil pitch is used in mixture with dipentene, the amount of tall oil pitch varies in inverse proportion to the amount of dipentene and is from 8 to 16 weight % with dipentene amounts of from 5 to 0.5 weight %.

12 Claims, No Drawings

PROCESS OF RECLAIMING RUBBER

BACKGROUND OF THE INVENTION

1. Field of the Invention

In the rubber industry use is made of great quantities of reclaimed rubber which is produced by degradation of rubber scrap, for example old car tires. Degradation of the rubber scrap is effected in conventional cases by the action of heat, mechanical processing and chemicals, in which process the textile and metal impurities included in the rubber are removed mechanically or chemically. Like raw rubber, reclaimed rubber is a plastic material which may be processed and vulcanized in the same manner as raw rubber.

2. Description of the Prior Art

There are six different conventional methods of reclaiming rubber scrap. The oldest method is the boiler or autoclave process in which the rubber scrap is heated in steam. In the autoclave process, use is made of high pressure steam at a temperature of approximately 200° C. Another conventional process is the acid process in which all fabric accompanying the rubber scrap is dissolved by means of boiling in acids, whereafter the remainder is plasticized in steam and flattened down on a mill. A third method is the alkali method in which caustic soda solution is used instead of acid to dissolve the textile material. Besides, this method entails a removal of free sulphur. This method is not suitable in conjunction with chemical reclaiming agents and has, therefore, now lost importance with the increasing occurrence of synthetic rubber in the rubber scrap. A fourth method is the neutral process in which metal chlorides are used instead of alkali to dissolve the textile material. The neutral process is normally carried out in large boilers in steam heated water (temperature approx. 200° C.), the textile material normally being dissolved by means of calcium chloride. A fifth method is the thermomechanical or thermochemical process in which the rubber scrap is processed at high temperature in a closed mixer, normally a propeller mixer or extruder, once the textile material has been mechanically removed.

In Chemical Abstracts, Vol. 84 (1976) col. 45783h is described a sixth method for reclaiming rubber scrap. This method may be described as direct reclaiming in the solid phase and comprises two operations, a first operation in which a mixture of natural rubber scrap in pulverulent form, process oil, phenyl hydrazine, ferrous chloride and methyl alcohol is agitated for 4 h, and a second operation during which the thus formed mixture is heated at 100° C. for 60 min. This prior art sixth reclaiming method thus requires a relatively long treatment time, i.e. 5 h.

It may be said of all of these prior art reclaiming processes that the raw material (the rubber scrap) is first crushed and finely ground. In the autoclave process, the thermochemical process and the neutral process the material, after heat treatment, must also be subjected to an intensive mechanical processing in a mill and extruder, a treatment which is called "refining". This treatment consumes much energy and work, since the material is heated intensely during the processing in the refining mill and the extruder. A great amount of heat energy must, thus, be dissipated by water-cooling. Furthermore, the refinery mill has to be supervised, which requires great skill in adjusting the mill to achieve the best results.

In a further development of the conventional neutral process, the autoclaved rubber material has, after hot air drying, instead been exposed to cryomilling in a mill, for example a vibration mill or a rotary blade mill, in which the material is kept cooled down to below $-60°$ C. by the supply of some coolant, in particular liquid nitrogen or carbonic acid. Granted, this cryomilling achieves a considerable energy saving, but even this prior art variant of the neutral process entails a high energy consumption.

The disadvantages inherent in the first five conventional reclaiming processes are, thus, primarily high production costs in the form of wages and energy consumption. Another disadvantage inherent in these processes is that the rubber scrap, after the actual reclaiming, i.e. degradation of the double bonds in the rubber material, need be subjected to a special refining process in order to be usable as a raw material for new vulcanized rubber products.

Direct reclaiming in accordance with the above-mentioned sixth method (Chemical Abstracts, Vol. 84) entails, it is true, an improvement on the other prior art reclaiming methods, but still necessitates a relatively long treatment time and unnecessary working operations.

SUMMARY OF THE INVENTION

The present invention is based on the discovery that it is possible to dispense with the expensive and energy-consuming refining and, moreover, to a considerable degree simplify and cheapen the reclaiming process, if a direct reclaiming of the vulcanized rubber scrap is carried out with the use of special plasticizers and a special redox system with a special catalyst in which even the reclaiming may be carried out rapidly in normal mixing equipment at low temperature, often room temperature.

Thus, the present invention departs from the above-mentioned sixth method, in which ground or crushed rubber scrap which is in the form of particles with a particle size of at most 1 mm, preferably at most 0.8 mm, and which has been freed of the major fraction of its textile or metal impurities is degraded by means of chemical reactants which comprise a reducing agent, an oxidizable iron metal chloride and a plasticizer, the reclaiming process being carried out in the solid phase in oxygen gas at a temperature of at most 100° C., preferably at most 80° C., by means of agitation in a powder blender, until the reducing agent has substantially completely reacted with double bonds in the rubber.

The characteristic features of the invention are that the reclaiming process is caused to continue for a period of at most 30 min, preferably from 3 to 15 min, that there is added, as reducing agent, a member of the group comprising phenyl hydrazine in an amount of from 0.2 to 1 weight % and diphenyl guanidine in an amount of from 0.2 to 0.8 weight %, that the iron metal chloride, preferably ferrous chloride, is added in an amount of from 0.1 to 0.4 weight %, and that there is added, as the plasticizer, at least one member from the group comprising tall oil pitch and dipentene, possibly in a mixture with some other plasticizer such as mineral process oil under the observation of the following prerequisites:

(a) that the total amount of plasticizer is maximum 17.5 weight %;

(b) that the amount of dipentene is maximum 5 weight %;
(c) that the amount of tall oil pitch is maximum 17.5 weight %;
(d) that the amount of dipentene, if it is used as sole plasticizer or in a mixture with another plasticizer, is from 0.5 to 5% weight %;
(e) that the amount of tall oil pitch, if it is used as sole plasticizer or in a mixture with another plasticizer than dipentene, is from 7 to 17.5 weight %;
(f) that the amount of other plasticizer than tall oil pitch and dipentene is at most 10 weight %; and
(g) that the amount of tall oil pitch, if it is used together with dipentene, varies in inverse proportion to the amount of dipentene and is from 8 to 16 weight % in dipentene amounts of from 5 to 0.5 weight %,
all of the percentages being calculated on the mixture of rubber scrap, reducing agent, iron metal chloride and plasticizer.

DESCRIPTION OF THE PREFERRED EMBODIMENT

A very great advantage of the method according to the invention is that the reclaiming may be carried out in a powder blender of normal type. Use can be made of powder blenders with one or more agitation impellers, which, here, are preferably driven at a peripheral speed of the order of magnitude of 2000 m/min. In large scale production, very good results have also been achieved with trough mixers of the ribbon type. However, a careful and accurate blending is more important than a rapid and intensive blending during the agitation phase.

The ground or crushed pulverulent rubber which has been substantially freed of textile and metal impurities is, thus, batched directly into the container of the powder blender together with chemicals and plasticizers, and thereafter occurs a blending and agitation of the batch for a relatively short time. Normally only from 3-10 minutes are necessary and often the total blending time may be as short as from 4 to 7 minutes. Nevertheless, the agitation must continue until substantially all of the phenyl hydrazine or diphenyl guanidine has reacted with double bonds in the rubber.

The thus reclaimed pulverulent rubber scrap may be used directly without any subsequent conventional refining. As a result, the reclaiming costs will be considerably reduced and the requisite production staff may be reduced to a great extent, approximately 50%, at the same time as the energy consumption in the reclaiming process may be reduced from 40 to 50%. Also the capital investment costs for the new reclaiming process are greatly reduced as compared with the majority of prior art reclaiming processes which require refining in expensive refining mills.

The new reclaiming method according to the present invention gives a better finished product, as is apparent from the following Examples. A relatively slight disadvantage inherent in the method according to the invention is, however, that the rubber scrap utilized as raw material for the reclaiming must, prior to the reclaiming method, be ground down to a finer particle size than is necessary in the first five of the above-mentioned prior art reclaiming processes. The extra cost for this fine grinding must, however, be considered as slight in comparison with the advantages which the reclaiming process otherwise achieves.

In the reclaiming method according to the invention, use is made of phenyl hydrazine or diphenyl guanidine and an oxidizable iron metal chloride as the chemical degradation system which cooperates with the oxygen in the air. The phenyl hydrazine or the diphenyl guanidine acts as a peptizing agent. The phenyl hydrazine may be added as it is or as a precursor, for example hydrazine hydrochloride which, during the reclaiming process, is degraded to phenyl hydrazine.

The reclaiming according to the present invention is carried out at unusually low temperatures, less than 100° C., whereas the majority of conventional processes where chemical reclaiming agents are used employ temperature levels of over 150° C. and normally up to 200° C. Other peptizing agents which are known, for example, for degrading raw rubber function, thus, first at higher temperatures than at 100° C. and, in this instance, the peptizing agents are dissolved in the rubber material. Experiments have shown that reclaiming vulcanized rubber scrap by the method according to the invention cannot be realized by means of the very well known peptizing agent RENASIT® 4 which is marketed by Bayer AG and which consists of a zinc salt of pentachlorothiophenol. This known peptizing agent does not, thus, function at low temperatures below 100° C. In any event, such a known peptizing agent does not give an industrially usable reclaimed product.

Another known peptizing agent which is usable in prior art reclaiming processes is hydrazine sulphonic acids. However, it has proved that neither is this known peptizing agent usable in the method according to the present invention.

Phenyl hydrazine is a very aggressive agent against organic substances with double bonds. Phenyl hydrazine has, however, a great advantage in that the degradation products of phenyl hydrazine, on reaction with the double bonds of the rubber scrap, will only be a few tenths of a percent benzene and nitrogen gas, which is highly advantageous from the point of view of the environment, even if the method advantageously is carried out in a closed agitator system.

As was mentioned above, use can be made of diphenyl guanidine instead of phenyl hydrazine. Experiments have shown that the reclaiming result will be equivalent if approximately the same amount of diphenyl guanidine is used. Compared with the expensive, unpleasant and dermo-aggressive phenyl hydrazine, diphenyl guanidine is considerably easier and more pleasant to use, int.al. because it is pulverulent. An amount of diphenyl guanidine of from 0.2 to 0.8 weight % is usable, but preferably from 0.3 to 0.5% is used, since diphenyl guanidine is also a vulcanization accelerator and can, therefore, in high contents influence the vulcanization process in the rubber mixtures which are prepared from the reclaim.

It is well known that rubber contains a very high share of double bonds of which perhaps only from 2 to 3% have reacted with sulphur during the vulcanization, but the remaining double bonds are still available for breaking, through the reclaiming process. In reclaiming by the method according to the present invention, the phenyl hydrazine and diphenyl guanidine, respectively, break a few percent of the double bonds in the rubber scrap, and after the reclaiming process, there remains substantially no phenyl hydrazine or diphenyl guanidine in the material. This entails that each rubber particle during the reclaiming will be reclaimed to a certain depth, the depth being determined by the proportions between the phenyl hydrazine and diphenyl guanidine, respectively, and the rubber material in the material mixture which is batched into the powder blender.

As was mentioned above, the rubber scrap is added in the form of particles of a particle size of at most 1 mm. Preferably, use is made, however, of a smaller particle size, for example at most 0.8 mm. Nevertheless it has proved that generally better results will be obtained if the rubber powder has even smaller particle size, the most preferred particle size range being up to 0.4 mm. Undoubtedly, the coarser rubber particles will be subjected to a satisfactory reclaiming, but, in view of the subsequent use of the reclaimed material, it is more advantageous if the particle size be less. The smaller particle size of at most 0.4 mm is, thus, most advantageous from the point of view of use and also from the point of view of quality with regard to the final vulcanized rubber product which is produced by means of the reclaimed pulverulent rubber.

The reclaiming is caused to continue for a sufficient time in order that the added phenyl hydrazine or diphenyl guanidine, respectively, be able substantially completely to react with the rubber scrap. This entails most often that the reclaiming need continue for a time of at most 15 min normally from 3 to 10 min or from 4 to 7 min.

As was also mentioned above, a plasticizer should be added together with the pulverulent rubber, the reducing agent and the oxidizable iron metal chloride. The plasticizer may consist of only dipentene, or only tall oil pitch, but it is also possible (and in many cases even advantageous) to use the dipentene and tall oil pitch in combination with each other or with some other plasticizer, for example process oil.

It has proved that dipentene which would seem to serve partly as a plasticizer and partly as a surfactant, and thereby spread the remaining constituents, realizes a very rapid plasticizing of the surface of the rubber particles and thereby makes it possible for the reducing agent to penetrate into the rubber in order to react with double bonds therein.

As was also mentioned above, it is possible to use dipentene only as the plasticizer during the reclaiming process, and, here, one may use from 1 to 5 weight %, calculated on the mixture of reducing agent, iron metal chloride, pulverulent scrap rubber and plasticizer. Even if higher contents than 5 weight % are technically uable, the maximum content should, for environmental safety reasons, be limited to 5 weight %.

If it is desired to achieve a more powerful plasticizing or if it is desired to extend the dipentene, the dipentene may be used in combination with some other conventional plasticizer. Such a usable plasticizer is an aromatic mineral oil of the spindle oil type. The supplementary plasticizer, for example, the spindle oil may be added in such amounts that the plasticizer has a function also in conjunction with the use of the reclaimed product for the manufacture of new rubber products.

If use is made of dipentene in combination with another plasticizer, the dipentene content in the number of cases may be reduced to 0.5 weight %.

Apart from, or instead of, the dipentene, use can be made, as plasticizer during the reclaiming, of tall oil pitch. Tall oil pitch is per se known as a plasticizer in the preparation of rubber mixtures on the basis of reclaimed rubber, but it has gone against the grain for persons skilled in the art to use tall oil pitch in high contents of above 10 weight %, since, in the processing in the processing mill, this has resulted in poor processibility, tacky consistency, adhesion to the rollers and a far too soft finished product. It should, therefore, be considered as surprising that high tall oil pitch contents give very good results in the reclaiming of rubber according to the direct reclaiming principle in the solid phase. Tall oil pitch contents of up to 17.5 weight-% have been tested with positive results, but with contents of less than 7 weight %, it is necessary to add an extra plasticizer. This may consist of dipentene or, for example, process oil. The amount of other plasticizer than tall oil pitch or dipentene should not, however, exceed 10 weight % if one wishes to avoid migrative problems in the products manufactured from reclaimed rubber. In use together with dipentene it must, moreover, be ensured that the tall oil pitch content is placed in inverse proportion to the dipentene content in the region of from 8 to 16 weight % in dipentene contents of from 5 to 0.5 weight %, for otherwise the result would be a far too poor and soft consistency in the rubber mixtures which are prepared from the reclaimed rubber.

A great advantage of the reclaiming method according to the invention is that reclaiming may be carried out at low temperatures of less than a 100° C. Most often it is possible to work at room temperature. During the reclaiming process, the temperature of the rubber material rises partly as a result of the reaction between the reducing agent and the rubber and partly as a result of the supply of mechanical energy during the mixing stage the use of slow agitation methods, for example a trough mixer of the ribbon type with a rotation speed of 20 rpm, the temperature increase as a result of the agitation will not be so great, whereas the temperature increase in the utilization of rapidly working impeller mixers may be from 20°-25° C. at high impeller speeds. The temperature increase as a result of the actual reaction between phenyl hydrazine and rubber may be several degrees Centigrade, for example from 15° to 20° C. with phenyl hydrazine contents of 0.7 weight %.

In the reclaiming method according to the present invention, only small amounts of phenyl hydrazine need be used and the preferred content range is from 0.2 to 1 weight %. Often, a content range of 0.2 to 0.8 weight % may be most advantageous.

The iron metal chloride must be oxidizable, that is to say the iron metal should be in a lower oxidation state than the maximum for the iron metal in question. Even if all three of the iron metals Fe, Ni and Co may be used, ferrous chloride is to be preferred. The iron metal chloride may be included at a low content, preferably from 0.1 to 0.4 weight %. During the reclaiming, the iron metal chloride is included in a redox system where, for example, the ferrous ions are oxidized to ferric ions.

In the reclaiming process according to the invention the different constituents should, in order to achieve the best results, be added to the mixer in a certain sequence. The rubber powder is added first, followed by the dipentene, then the phenyl hydrazine and finally the iron metal chloride. As a result of this addition sequence a better distribution of the phenyl hydrazine will be obtained before the iron metal chloride is added which starts the actual reclaiming reaction for which is required an addition of oxygen from the air in the mixer.

For facilitating the addition and distribution or spreading of the iron metal chloride, this may, prior to being added, have been dissolved in a slight amount of methyl alcohol. However, the total content of methyl alcohol should be kept low for reasons of environmental safety. Most of the methyl alcohol evaporates during the agitation stage. A methyl alcohol amount of from 0.5 to 1.5 weight % calculated on the amounts of rubber powder, plasticizer, reducing agent and iron metal chloride, is suitable.

In the use of diphenyl guanidine instead of phenyl hydrazine, it is more appropriate to add the constituents in a different sequence. After the addition of the pulverulent rubber scrap, the pulverulent diphenyl guanidine is, thus, added, whereafter follows the addition of the plasticizer, for example tall oil pitch, and finally the iron metal oxide which may be dissolved in methanol. However, the iron metal oxide may first have been dissolved in the plasticizer and, in such an event, is added together with the plasticizer.

At the end of the mixing and agitation stage, it may be advantageous to add an antitackifier, for example common kaolin, talcum or the like. As a result of this antitackifier, the discrete particles of the reclaim will not adhere together, which facilitates the future use of the reclaim and also its storage and handling.

The reclaimed rubber material produced by the process according to the invention can, after the admixture of zinc oxide, stearic acid, sulphur and accelerator, be vulcanized and has, in the vulcanized state, as a rule properties within the following ranges:

| Hardness, °Shore | 60–66 |
|---|---|
| Tensile strength at break, MPa | 7.0–9.0 |
| Elongation at break, % | 190–230 |
| Density, g/cm$^3$ | 1.18–1.22 |
| Aging properties | On the same level as a newly manufactured conventional tread compound |

It has proved that the reclaimed rubber material produced according to the invention can, on being blended with a minor amount of raw rubber, normally approximately 6%, and conventional vulcanizing agents, be used directly for the manufacture of simple products with fully satisfactory physical properties (for example scraper mats, bus floor mats, rubber pedal covers, dust hoods etc). In this context, use can be made of natural rubber or styrene butadiene rubber as the raw rubber.

The invention will be illustrated hereinbelow by some Examples. In these Examples, use was made of commercially available rubber scrap which had been obtained from scrap tires of normal composition. The pulverulent rubber scrap was manufactured in a conventional manner by cracking and cleaning so that substantially all of the metal and textile material had been removed from the rubber. The recipes for the reclaiming mixtures in Examples 1–4 are apparent from Table 1.

EXAMPLE 1

In this Example, use was made of a scrap rubber powder of a particle size of at most 0.8 mm. The agitation was carried out in a powder mixer which was equipped with an agitator impeller at the bottom of a cylindrical vessel. The impeller was driven at a peripheral speed of the order 2000 m/min. The scrap rubber powder was first batched into the impeller mixer, thereafter dipentene and tall oil pitch were added, and after a certain period of agitation, the phenyl hydrazine. The ferrous chloride was added in mixture with the methyl alcohol.

After the addition of the ferrous chloride, the agitation continued for 7 min. Thus, the agitation took place in the solid phase under intensive mixing of the material in that air which was present in the mixing container. During the mixing process, it proved that the phenyl hydrazine, together with the oxygen of the air, realized a degradation of the rubber particles to such an extent that the rubber powder could thereafter directly be used in the manufacture of vulcanized products. The temperature at the beginning of the agitation process was room temperature, even if temperatures of up to 100° C. may be employed.

It proved that added phenyl hydrazine had substantially completely reacted with the rubber powder while producing a few tenths of a percent of benzol and nitrogen gas which were found in the atmosphere in the powder mixer.

After approximately 1 day, the thus produced pulverulent rubber reclaim was tested and compared with known, commercially available reclaimed rubber materials. For the purpose of this test, use was made of the rubber recipe disclosed in Table 2.

As comparison material, use was made of a commercially available reclaimed rubber material from Poland and a commercially available reclaimed rubber material from the Federal Republic of Germany. After the processing of the three rubber blends, they were calendered to 2 mm thick sheets which were vulcanized for 10 min. at 160° C. After the vulcanization, the hardness, tensile strength at break, elongation at break, tear resistance and density of the three materials were tested. The results of these tests are apparent from Table 3.

TABLE 1

| Constituents | Example 1 Weight kg | % | Example 2 Weight g | % | Example 3 Weight g | % | Example 4 Weight kg | % |
|---|---|---|---|---|---|---|---|---|
| rubber powder | 132 | 91.5 | 190 | 96.57 | 190 | 94.65 | 260 | 91 |
| dipentene | 1.5 | 1.05 | 4.5 | 2.29 | 4.5 | 2.24 | 3.0 | 1.05 |
| tall oil pitch | 9.75 | 6.76 | — | — | — | — | 19.5 | 6.83 |
| process oil$^x$ | — | — | — | — | 4 | 1.99 | — | — |
| phenyl hydrazine | 0.3 | 0.21 | 1.5 | 0.76 | 1.5 | 0.75 | 2.1 | 0.74 |
| FeCl$_2$ . 4H$_2$O | 0.6 | 0.42 | 0.75 | 0.38 | 0.75 | 0.37 | 1.05 | 0.38 |
| | | 100% | | 100% | | 100% | | 100% |
| methyl alcohol | 1.35 | | 4 | | — | | 5.0 | |
| antitackifier$^{xx}$ | 4.5 | | 4 | | 4 | | 9.0 | |

$^x$aromatic mineral oil ESL 385
$^{xx}$Swedish kaolin

TABLE 2

| Test recipe | |
|---|---|
| Pulverulent reclaims | 100 parts by weight |
| Zinc oxide | 2 parts by weight |
| Stearic acid | 0.80 parts by weight |

TABLE 2-continued

| Test recipe | |
|---|---|
| Sulphur | 1 part by weight |
| SANTOCURE ® (accelerator) (cyclohexyl benzothiazyl sulphenamide) | 0.60 parts by weight |

TABLE 3

| Properties | Pulverulent reclaims according to the invention (Example 1) | Polish pulverulent rubber reclaims | German pulverulent rubber reclaims |
|---|---|---|---|
| Hardness, °Shore | 66 | 54 | 56 |
| Tensile strength at break MPa | 7.6 | 6.9 | 5.4 |
| Elongation at break, % | 190 | 340 | 230 |
| Tear resistance, N | 55 | 42 | 38 |
| Density, g/cm³ | 1.22 | 1.16 | 1.20 |

EXAMPLE 2

This example was carried out on a laboratory scale. The mixer used was a normal domestic beating machine with two counter rotating beater wings and a rotating mixer bowl (Philips "5 Electronic"). The beating machine was driven at its maximum speed. In this case, the particle size of the rubber powder was at most 0.4 mm. The sequence of adding the different constituents was: rubber powder, dipentene, phenyl hydrazine, ferrous chloride and finally the antitackifier. The latter was added first 12 min after the addition of ferrous chloride. The total mixing time, counted from the ferrous chloride addition was 15 min. The mixing procedure was carried out at room temperature and the temperature in the mixture rose during the reaction. The temperature continued to rise slightly for approximately 1 hour after the end of the agitation period.

After approximately 1 day's storage, the reclaim was mixed with vulcanization agent according to the recipe in Table 2 and was vulcanized as 2 mm sheets at 160° C. for 10 min. The vulcanized sheets had a hardness of 62° Shore, tensile strength at break of 6.8 MPa and elongation at break of 230%.

This Example shows that one may use dipentene as the only plasticizer.

EXAMPLE 3

This Example was also carried out on a laboratory scale in accordance with that disclosed in Example 2. In this case, use was made of two plasticizers, namely dipentene and a process oil, that is to say an aromatic mineral oil of the type spindle oil (ESL 385). The finished reclaim was vulcanized and tested in the same manner as the reclaim in Example 2. The vulcanized sheets proved to have a hardness of 65° Shore, a tensile strength at break of 6.3 MPa and an elongation at break of 190%.

EXAMPLE 4

This Example was carried out on a large scale in a trough mixer of the ribbon type, the mixing time being 15 min. The rubber powder had a particle size of at most 0.6 mm. The sequence of adding the different constituents was the same as in Example 1. The thus obtained reclaim was tested with the help of the following recipe:

| | Parts by weight |
|---|---|
| Pulverulent reclaim | 100 |
| ZnO | 2 |
| Stearic acid | 0.80 |
| Sulphur | 1 |
| Accelerator | 0.60 |
| Process oil | 2 |

In this case, the accelerator was SULFENAX CB (cyclohexyl benzothiazyl sulphanamide) and the process oil was the above-mentioned aromatic mineral oil ESL 385.

After calendering to 2 mm sheets and vulcanization for 10 min. at 160° C., the following properties were ascertained: hardness of 60° Shore, tensile strength at break 7.0 MPa, elongation at break 260% and density 1.18 g/cm³.

EXAMPLES 5-7

In these Examples use was made of laboratory equipment in accordance with Example 2, and the Examples were carried out in order to illuminate the effect of dipentene compared with mineral oil (process oil) as plasticizer.

To this end, use was made of rubber scrap formed of car tires only which contained approximately 50% carbon black and which had been ground to a particle size of less than about 0.59 mm (−30 mesh U.S. sieve series). The constituents in the recipe were added to the mixer in the sequence disclosed in Table 4, the ferrous chloride being added in the form of a solution in methanol. The addition time was 5 min and, thereafter, the mixer was run for a further 30 min. At the end of the mixing process, each pulverulent reclaim was allowed to stand overnight, whereafter the powder was utilized in the testing recipe disclosed in the Table.

From the results in Table 4, it will be apparent that only mineral oil in an amount of approximately 4.7% by weight (calculated on the entire amount of material introduced into the mixer) or 5 phr, i.e. 5 parts per 100 parts by weight of rubber, gave a pulverulent reclaim of extremely poor processibility in the mixing mill. Such a pulverulent reclaim is not usable in commercial production, since processibility in the mixing mill is of extreme importance in order that a rational and high quality processing of the rubber mixture may be obtained. The Mooney viscosity was above 200.

Even if the mineral oil amount was increased greatly to about 12.1% (14 phr) in Example 6, the processibility in the mixing mill was still very poor and a brittle unvulcanized sheet was obtained which was very difficult to handle without its breaking apart. The increased amount of plasticizer lowered, however, the Mooney viscosity, but taken as a whole, this pulverulent reclaim must also be considered as unusable from a commercial point of view.

When a slight amount of dipentane (approx. 2.75% by weight or 3 phr) was added as plasticizer, apart from the mineral process oil in Example 5, a marked improvement was obtained in the processibility in the mixing mill. This is apparent from Example 7 which, thus, shows the manifest effect of dipentene as a plasticizer in conjunction with directly reclaiming of rubber scrap in the solid phase.

EXAMPLES 8-10

In these Examples, use was made of the same laboratory equipment, rubber scrap, test recipe, addition time, extra running time for the mixer and aging time for the reclaim as in Examples 5-7.

Examples 8-10 illuminate the effect of the tall oil pitch as a plasticizer and the possibility of using diphenyl guanidine instead of phenyl hydrazine as peptizing agent. In Examples 8 and 9, the phenyl hydrazine was dissolved in methanol and the ferrous chloride was dispersed in the tall oil pitch and the constituents were added to the mixer in the following sequence: rubber scrap, phenyl hydrazine (dissolved in the methanol), ferrous chloride (dispersed in the tall oil pitch), and finally (in Example 8) the process oil. In Example 10, the ferrous chloride was dissolved in the methanol and then mixed with the tall oil pitch. Thereafter, the constituents were added to the mixer in the following sequence: rubber scrap, diphenyl guanidine (pulverulent) and the mixture of ferrous chloride and tall oil pitch. In all cases, the tall oil pitch had been preheated to 30°-40° C. in order to be more easily manageable.

In a comparison of the results in Tables 4 and 5, it may be ascertained that the tall oil pitch either alone or in a mixture with process oil gave usable reclaims and it is, thus, possible to dispense with the dipentene. Furthermore, it is apparent that the phenyl hydrazine could be replaced by diphenyl guanidine. This is advantageous from several points of view, since phenyl hydrazine is expensive, unpleasant to handle and attacks the skin. The pulverulent diphenyl guanidine is considerably easier and more pleasant to deal with.

EXAMPLES 11-16

In these Examples, use was made of the same laboratory equipment, rubber scrap and aging time for the reclaim as in Examples 5-7. The reclaiming was performed at room temperature. The batch size was 300 g of rubber scrap. The addition time was approx. 3 min., and the mixer was thereafter run a further 12 min. such that the total time in the mixer was approx. 15 min. After aging overnight, the pulverulent reclaim was used in a test recipe which is disclosed in Table 6 and contained natural rubber in order to lower the Mooney viscosity and better to approximate normal conditions of use for the rubber reclaim. The mixing was carried out in a laboratory mixing mill and the obtained, unvulcanized, rubber mixture was utilized for the production of test sheets which were vulcanized for 10 min. at 160° C. The test results with the different rubber mixtures are given in Table 7.

Examples 11-16 illustrate the effect of the plasticizer. Tall oil pitch as such gives a good reclaiming of the rubber scrap. As is apparent from Table 7, such high contents as up to 20 parts of tall oil pitch per 100 parts of pulverulent rubber scrap gave good results. At low tall oil pitch contents and, in particular at tall oil pitch contents below 8 parts per 100 parts of pulverulent rubber scrap, a reinforcement of the effect of the tall oil pitch is needed by means of an addition of dipentene (Example 1). Dipentene can be completely dispensed with in tall oil pitch contents of about 10 parts per 100 parts of pulverulent rubber scrap. As is apparent from Examples 15, 16 and also 3 and 7, the dipentene results in a good reclaim even when it is used together with other plasticizers in the form of mineral oil. One disadvantage with dipentene is, however, its offensive smell. The use of solely plasticizer in the form of mineral oil type does not function satisfactorily, as is apparent from Examples 5, 6 and 16. The processibility properties, that is to say processibility in a mixing mill will, in this case, be poor and the Mooney viscosity will be far too high if no unvulcanized natural rubber is added to the rubber mixture. When a mineral oil content of 8 phr is used, as small an addition of 1 phr of dipentene (Example 15) results in an improvement of the processibility in the mixing mill. Good results are obtained by the addition of 3 phr of dipentene, as is apparent from Example 16.

TABLE 6

| Test recipe | |
|---|---|
| Pulverulent reclaim | 89.7% by weight |
| Natural rubber | 6.0% by weight |
| Zinc oxide | 1.9% by weight |
| Stearic acid | 0.8% by weight |
| Sulphur | 1.0% by weight |
| SANTOCURE ® | 0.6% by weight |
| | 100.0% by weight |

EXAMPLES 17 and 18

In these Examples, phenyl hydrazine and diphenyl guanidine were compared as components in the used redox system. In the Examples, use was made of the same laboratory equipment, rubber scrap, aging time for the reclaim, batch size, addition time and total time in the mixer as in Examples 11-16. The reclaiming was performed at room temperature. The test recipe, mixing equipment, vulcanization conditions and test results are given in Table 8. It may be ascertained from this Table that the phenyl hydrazine can advantageously be replaced by an approximately equally high content of diphenyl guanidine, equivalent results being obtained. However, the diphenyl guanidine content should most preferably be kept lower than the phenyl hydrazine content, since diphenyl guanidine, moreover, acts as a vulcanization accelerator and may exercise this effect during the vulcanization of the contemplated finished product.

EXAMPLE 19

This Example illustrates the reclaiming of pulverulent rubber scrap on a factory scale. For this purpose, use was made of a trough mixer of the ribbon mixer type with a capacity of 1 m$^3$. The batch size was 350 kg of pulverulent rubber scrap which had been ground to less than 0.59 mm particle size (−30 mesh U.S. Sieve Series). At the batching in the trough mixer, the pulverulent rubber had a temperature of about 10° C. Thereafter, the pulverulent diphenyl guanidine was added, whereupon the mixer was allowed to run for approx. 2 min. Hereafter followed the addition of the tall oil pitch which had been preheated to approx. 40° C. which resulted in a temperature increase of about 6° C. in the batch. Finally, the ferrous chloride dissolved in the methanol was added. The addition of the tall oil pitch and the ferrous chloride took about 5 min. Once all of the ferrous chloride had been added, the mixer was allowed to run for some further 15 min. Before testing, the reclaim was allowed to stand overnight.

For testing the thus obtained reclaim, use was made of the test recipe which is disclosed in Table 6. The mixing was carried out in a Banbury mixer and the obtained rubber mixture was utilized for the production of test sheets which were vulcanized for 10 min. at 160° C. The test results are given in Table 9 and from these it will be apparent that a good reclaim is obtained on production on a factory scale.

TABLE 9

|  | EXAMPLE 19 | |
|---|---|---|
|  | Parts by weight | % by weight |
| Recipe: | | |
| Pulverulent rubber scrap | 100 | 87.18 |
| Tall oil pitch | 13.9 | 12.12 |
| FeCl$_2$ . 4H$_2$O | 0.5 | 0.44 |
| Diphenyl guanidine | 0.3 | 0.26 |
|  | 114.7 | 100.00 |
| Methanol | 1.0 | |
| Test results: | | |
| Mooney viscosity 100° C. ML 1 + 4 | ~50 | |
| Hardness, °Shore | 64 | |
| Tensile strength at break, MPa | 10.7 | |
| Elongation at break, % | 310 | |
| Spec. weight g/cm$^3$ | 1.19 | |

TABLE 4

|  | Example 5 | | Example 6 | | Example 7 | |
|---|---|---|---|---|---|---|
|  | Parts by weight | % by weight | Parts by weight | % by weight | Parts by weight | % by weight |
| Recipe: | | | | | | |
| Rubber scrap | 300.0 | 93.90 | 300.0 | 86.58 | 300.0 | 91.32 |
| process oil | 15.0 | 4.69 | 42.0 | 12.12 | 15.0 | 4.57 |
| dipentene | — | — | — | — | 9.0 | 2.74 |
| phenyl hydrazine | 3.0 | 0.94 | 3.0 | 0.87 | 3.0 | 0.91 |
| FeCl$_2$ . 4H$_2$O | 1.5 | 0.47 | 1.5 | 0.43 | 1.5 | 0.46 |
|  | 319.5 | 100.00 | 346.5 | 100.00 | 328.5 | 100.00 |
| methanol | 15.0 | | 15.0 | | 15.0 | |
| Initial temperature, °C. | 25.5 | | 26.0 | | 25.5 | |
| Final temperature, °C. | 25.0 | | 26.0 | | 28 | |
| Test results (note 1): | | | | | | |
| Mooney viscosity 100° C. ML 1 + 4 | >200 | | 100 | | 144 | |
| Hardness, °Shore | 62 | | 52 | | 64 | |
| Tensile strength at break, MPa | 7.0 | | 6.0 | | 10.3 | |
| Elongation at break, % | 210 | | 230 | | 240 | |
| Spec. weight, g/cm$^3$ | 1.17 | | 1.16 | | 1.17 | |
| Note No. | 2 | | 2 | | 3 | |

Note 1: Test recipe:

| Pulverulent reclaim | 100 | parts by weight |
| zinc oxide | 2.0 | parts by weight |
| stearic acid | 0.9 | parts by weight |
| sulphur | 1.1 | parts by weight |
| SANTOCURE ® | 0.8 | parts by weight |

The mixing was carried out in a mixing mill for 20 min. Test sheets vulcanized 10 min. at 160° C.

Note 2: The processability in the mixing mill was very poor. Brittle, almost unmanageable unvulcanized sheet obtained.
Note 3: Processability in the mixing mill satisfactory

TABLE 5

|  | Example 8 | | Example 9 | | Example 10 | |
|---|---|---|---|---|---|---|
|  | Parts by weight | % by weight | Parts by weight | % by weight | Parts by weight | % by weight |
| Recipe | | | | | | |
| Pulverulent rubber scrap | 300.0 | 87.34 | 300.0 | 91.57 | 300.0 | 91.74 |
| process oil | 15.0 | 4.37 | — | — | — | — |
| tall oil pitch | 24.0 | 6.99 | 24.0 | 7.33 | 24.0 | 7.34 |
| phenyl hydrazine | 3.0 | 0.87 | 2.1 | 0.64 | — | — |
| diphenyl guanidine | — | — | — | — | 1.5 | 0.46 |
| FeCl$_2$ . 4H$_2$O | 1.5 | 0.43 | 1.5 | 0.46 | 1.5 | 0.46 |
|  | 343.5 | 100.00 | 327.6 | 100.00 | 327.0 | 100.00 |
| methanol | 15.0 | | 15.0 | | 15.0 | |
| Initial temperature, °C. | 25.5 | | 25.5 | | 25.5 | |
| Final temperature, °C. | 32 | | 30 | | 28.5 | |
| Test results (note 1): | | | | | | |
| Mooney viscosity 100° C. ML 1 + 4 | 100 | | 132 | | 137 | |
| Hardness, °Shore | 62 | | 66 | | 67 | |
| Tensile strength at break, MPa | 8.4 | | 11.3 | | 11.8 | |
| Elongation at break, % | 250 | | 260 | | 260 | |
| Spec. weight, g/cm$^3$ | 1.15 | | 1.17 | | 1.17 | |
| Note No. | 2 | | 3 | | 3 | |

Note 1: Please see Table 4
Note 2: Processability in the mixing mill satisfactory
Note 3: Processability in the mixing mill good

TABLE 7

|  | Example 11 | | Example 12 | | Example 13 | | Example 14 | | Example 15 | | Example 16 | |
|---|---|---|---|---|---|---|---|---|---|---|---|---|
|  | Parts by weight | % by weight | Parts by weight | % by weight | Parts by weight | % by weight | Parts by weight | % by weight | Parts by weight | % by weight | Parts by weight | % by weight |
| Recipe: | | | | | | | | | | | | |
| pulverulent rubber scrap | 100 | 87.34 | 100 | 84.89 | 100 | 82.78 | 100 | 91.91 | 100 | 91.07 | 100 | 89.44 |
| tall oil pitch | 13.7 | 11.96 | 17.0 | 14.43 | 20.0 | 16.56 | — | — | — | — | — | — |
| mineral oil | — | — | — | — | — | — | 8.0 | 7.35 | 8.0 | 7.29 | 8.0 | 7.16 |
| dipentene | — | — | — | — | — | — | — | — | 1.0 | 0.91 | 3.0 | 2.68 |
| ferrous chloride | 0.5 | 0.44 | 0.5 | 0.42 | 0.5 | 0.41 | 0.5 | 0.46 | 0.5 | 0.46 | 0.5 | 0.45 |
| diphenyl guanidine | 0.3 | 0.26 | 0.3 | 0.26 | 0.3 | 0.25 | 0.3 | 0.28 | 0.3 | 0.27 | 0.3 | 0.27 |

TABLE 7-continued

|  | Example 11 | | Example 12 | | Example 13 | | Example 14 | | Example 15 | | Example 16 | |
| --- | --- | --- | --- | --- | --- | --- | --- | --- | --- | --- | --- | --- |
|  | Parts by weight | % by weight | Parts by weight | % by weight | Parts by weight | % by weight | Parts by weight | % by weight | Parts by weight | % by weight | Parts by weight | % by weight |
|  | 114.5 | 100.00 | 117.8 | 100.00 | 120.8 | 100.00 | 108.8 | 100.00 | 109.8 | 100.00 | 111.8 | 100.00 |
| methanol | 1.0 | | 1.0 | | 1.0 | | 1.0 | | 1.0 | | 1.0 | |
| Temperature increase °C. | +4 | | +3 | | +2 | | ±0 | | +1.5 | | +0.5 | |
| Test results: | | | | | | | | | | | | |
| Mooney viscosity 100° C. ML 1 + 4 | 45 | | 37 | | 32 | | 68 | | 60 | | 49 | |
| Hardness, °Shore | 64 | | 60 | | 61 | | 61 | | 60 | | 57 | |
| Tensile strength at break, MPa | 8.2 | | 9.1 | | 9.0 | | 9.2 | | 8.4 | | 8.5 | |
| Elongation at break, % | 280 | | 320 | | 320 | | 220 | | 230 | | 250 | |
| Spec. weight g/cm³ | 1.20 | | 1.16 | | 1.15 | | 1.16 | | 1.16 | | 1.16 | |
| Note No. | 4 | | 4 | | 3 | | 1 | | 2 | | 3 | |

Note 1: Processability in the mixing mill very poor, brittle, almost unmanageable unvulcanized sheet obtained despite the addition of unvulcanized natural rubber to the testing recipe.
Note 2: Processability in the mixing mill satisfactory.
Note 3: Processability in the mixing mill good
Note 4: Processability in the mixing mill excellent

TABLE 8

|  | Example 17 | | Example 18 | |
| --- | --- | --- | --- | --- |
|  | Parts by weight | % by weight | Parts by weight | % by weight |
| Recipe: | | | | |
| Pulverulent rubber scrap | 100 | 90.29 | 100 | 90.46 |
| Tall oil pitch | 10 | 9.03 | 10 | 9.05 |
| FeCl₂ . 4H₂O | 0.25 | 0.23 | 0.25 | 0.22 |
| Phenyl hydrazine | 0.50 | 0.45 | — | — |
| Diphenyl guanidine | — | — | 0.30 | 0.27 |
|  | 110.75 | 100.00 | 110.55 | 100.00 |
| Methanol | 1.00 | | 1.00 | |
| Temperature increase, °C. | +3.5 | | +2.9 | |
| Test results (Note 1) | | | | |
| Mooney viscosity 100° C. ML 1 + 4 | 72 | | 36 | |
| Hardness, °Shore | 70 | | 71 | |
| Tensile strength at break, MPa | 8.4 | | 8.3 | |
| Elongation at break % | 230 | | 230 | |
| Spec. weight g/cm³ | 1.20 | | 1.21 | |

Note 1 Test recipe
| Pulverulent reclaim | 95.2% | Mixing in laboratory |
| Zinc oxide | 2.0% | mixing mill |
| Stearic acid | 0.8% | |
| Sulphur | 1.0% | Test sheets vulcanized |
| SANTOCURE® Mohr | 1.0% | 15 min at 143° C. |

What I claim and desire to secure by Letters Patent is:

1. Process of reclaiming rubber in which ground or crushed rubber scrap which has the form of particles with a particle size of at most 1 mm which has been freed of the major fraction of its textile or metal impurities, is degraded with the aid of chemical reclaiming agents which comprise a reducing agent, an oxidizable iron metal chloride and a plasticizer, the reclaiming being carried out in the solid phase in oxygenic gas at a temperature of at most 100° C. by agitation in a powder mixer, until the reducing agent has substantially completely reacted with double bonds in the rubber, wherein said reclaiming is caused to continue for a time of at most 30 min. wherein, as a reducing agent, there is added a member of the group consisting of phenyl hydrazine in an amount of 0.2-1 weight % and diphenyl guanidine in an amount of 0.2-0.8 weight %, wherein the iron metal chloride is added in an amount of from 0.1 to 0.4 weight %, wherein, as plasticizer there is added a composition comprising at least one member selected from the group consisting of tall oil pitch and dipentene, providing:

(a) that the total amount of plasticizer is at most 17.5 weight %;

(b) that the amount of dipentene is at most 5 weight %;

(c) that the amount of tall oil pitch is at most 17.5 weight %;

(d) that the amount of dipentene, when it is used as a sole plasticizer or in mixture with another plasticizer, is from 0.5 to 5 weight %;

(e) that the amount of tall oil pitch, when it is used as sole plasticizer or in mixture with a plasticizer other than dipentene, is from 7 to 17.5 weight %;

(f) that the amount of any plasticizer other than tall oil pitch and dipentene is at most 10 weight %; and (g) that the amount of tall oil pitch, when it is used together with dipentene, varies in inverse proportion to the amount of dipentene and is from 8 to 16 weight % with dipentene amounts of from 5 to 0.5 weight %; all of the above percentages being calculated on the mixture of rubber scrap, reducing agent, iron metal chloride and plasticizer.

2. Process according to claim 1 wherein said temperature is at most 80° C.

3. Process according to claim 1, wherein the direct reclaiming is carried out at a temperature of at most 60° C.

4. Process according to claim 1, wherein, as reducing agent, there is added diphenyl guanidine in an amount of 0.3-0.5 weight %.

5. Process according to claim 1 wherein the rubber is added in the form of particles with a particle size of at most 0.8 mm.

6. Process according to claim 1, wherein the rubber is added in the form of particles with a particle size of at most 0.4 mm.

7. Process according to any one of claims 1 wherein the direct reclaiming is carried out under agitation in an impeller mixer, whose impeller or impellers are preferably driven at a peripheral speed of the order of magnitude of 2000 m/min.

8. Process according to any one of claims 1 wherein the direct reclaiming is carried out under agitation in a trough mixer of the ribbon mixer type.

9. Process according to any one of claims 7, or 8 wherein an antitackifier, preferably kaolin, is added to the mixer during the later stage of the agitation phase.

10. Process according to claim 1 wherein said time is from 3 to 15 minutes.

11. Process according to claim 1 wherein said iron metal chloride is ferrous chloride.

12. Process according to claim 1 wherein said plasticizer other than dipentene and other than tall oil pitch is mineral process oil.

* * * * *